Figure 4:
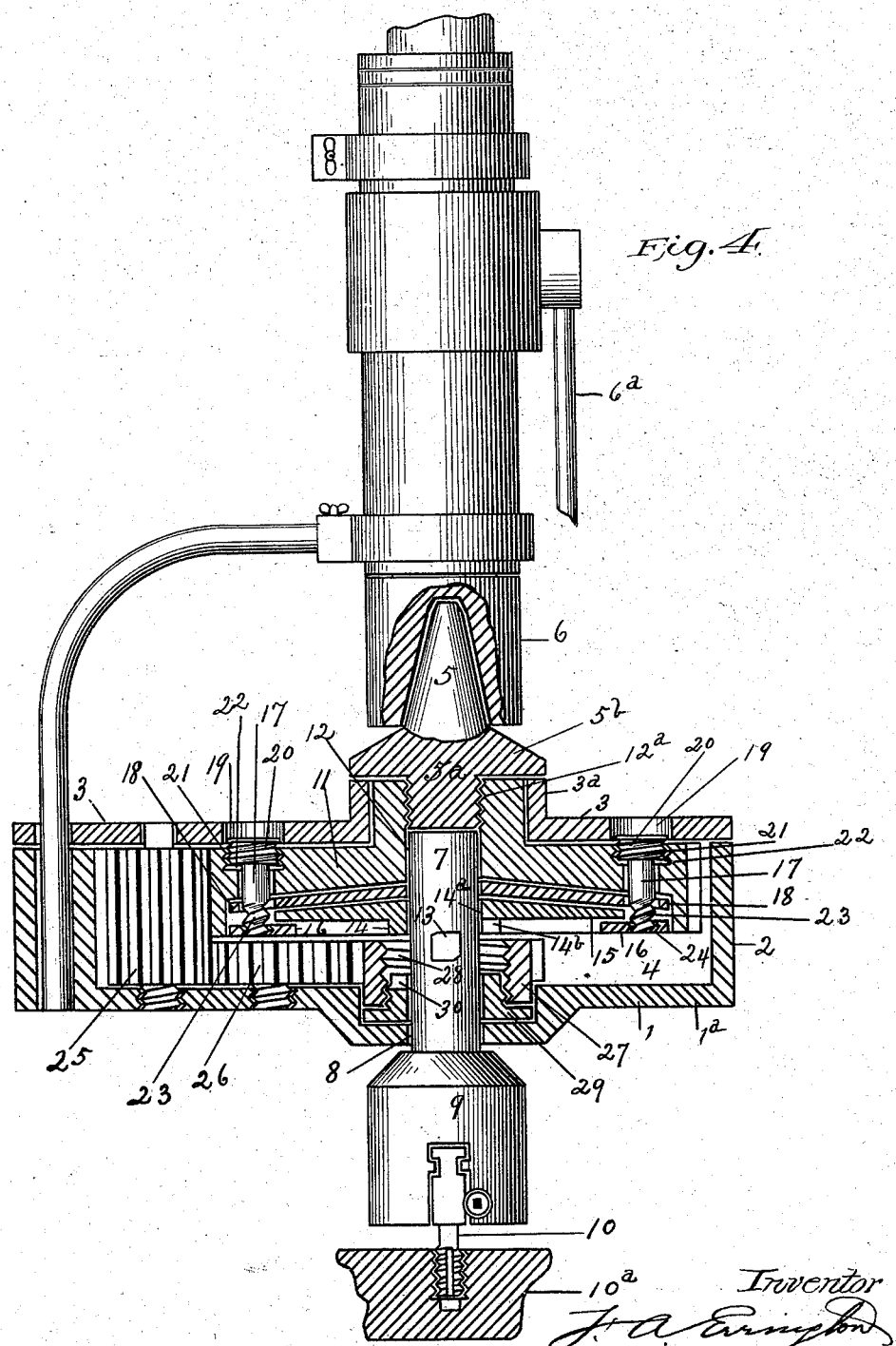

(No Model.) 2 Sheets—Sheet 1.
F. A. ERRINGTON.
TAPPING ATTACHMENT.
No. 558,055. Patented Apr. 14, 1896.
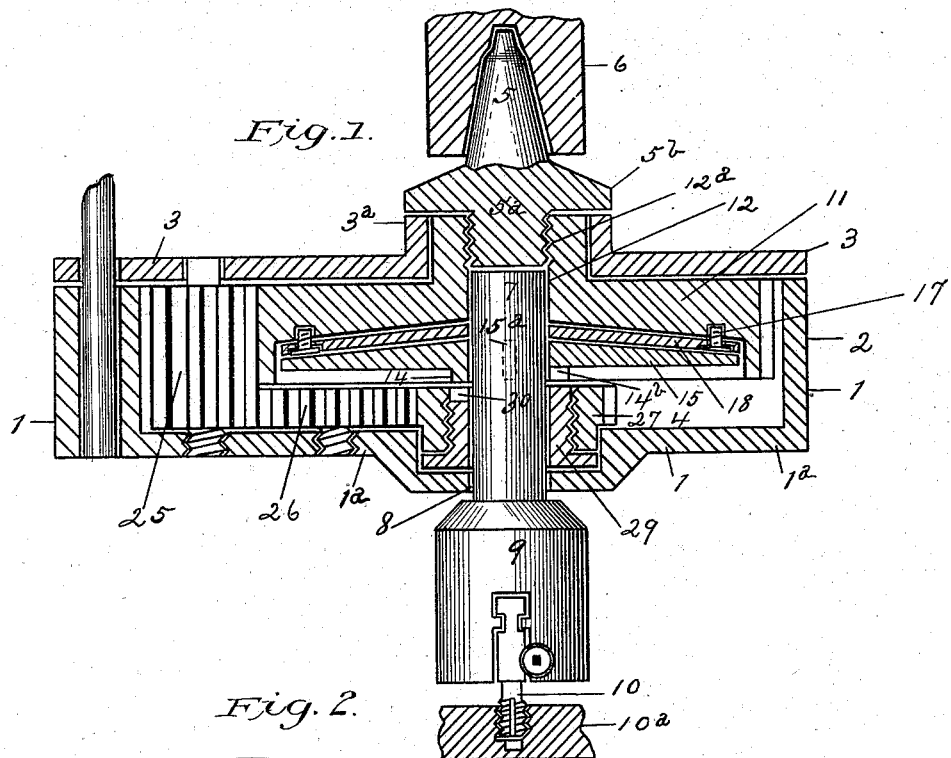
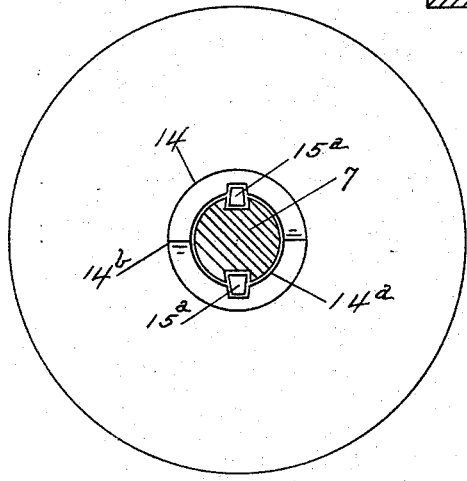
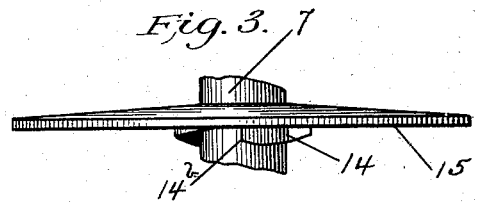
Witnesses
Inventor (No Model.)  2 Sheets—Sheet 2.

F. A. ERRINGTON.
TAPPING ATTACHMENT.

No. 558,055. Patented Apr. 14, 1896.

Witnesses
Alex Scott
Ani Long

Inventor
F. A. Errington

UNITED STATES PATENT OFFICE.

FRANKLIN ALFRED ERRINGTON, OF EDGEWATER, NEW YORK.

TAPPING ATTACHMENT.

SPECIFICATION forming part of Letters Patent No. 558,055, dated April 14, 1896.

Application filed April 17, 1894. Serial No. 507,822. (No model.)

*To all whom it may concern:*

Be it known that I, FRANKLIN ALFRED ERRINGTON, a citizen of the United States, residing in the village of Edgewater, (P. O. Stapleton,) county of Richmond, in the State of New York, have invented certain new and useful Improvements in Tapping Attachments, of which the following is a specification.

My invention relates more particularly to the class of tapping attachments shown in my applications filed in the United States Patent Office April 1, 1893, Serial No. 486,647, and March 27, 1894, Serial No. 505,256, respectively; and it has for its object to provide friction devices between the longitudinally-movable spindle and the main rotative spindle, so that should the two meet with undue resistance the parts can move independently to prevent breakage.

The invention consists in the combination of a rotative spindle with a longitudinally-movable spindle, friction devices between said spindles for causing said rotative spindle to turn said longitudinally-movable spindle, and means for permitting said rotative spindle to turn said longitudinally-movable spindle in a reverse direction.

The invention also consists in the novel details of improvements and the combinations of parts that will be more fully hereinafter set forth, and then pointed out in the claims.

Reference is to be had to the accompanying drawings, forming part hereof, wherein—

Figure 1 is a central cross-section of a tapping attachment embodying my improvements. Fig. 2 is an inverted plan view of the friction-disk. Fig. 3 is an edge view of the friction-disk; and Fig. 4 is a central cross-section of the device, showing the changes necessitated when it is desired to increase the tension of the friction beyond that obtained by the simpler and less powerful driving mechanism shown in Fig. 1.

In the accompanying drawings, in which similar numerals of reference indicate corresponding parts in the several views, the numeral 1 indicates a suitable casing, which may be of any desired form or as shown in my said application, Serial No. 505,256, $1^a$ being a bottom plate, 2 upturned sides, and 3 a cover suitably held on the sides 2, whereby a space 4 is provided in which the mechanism is located.

5 is a rotative spindle arranged to be connected with the spindle 6 of a drill-press or other suitable tool or machine, such as a lathe.

7 is a longitudinally-movable spindle passing freely through the opening 8 in the plate $1^a$ of the casing, wherein said spindle can rotate, the walls of the opening 8 forming a bearing for said spindle at its lower part.

9 is a suitable chuck arranged to be attached to the spindle 7 and to carry a tool 10, such as a tap, drill, or the like.

Between the spindles 5 and 7 is placed suitable mechanism whereby the spindle 5 may turn the spindle 7 alternately in opposite directions. In the example shown the spindle 5 is connected to a spur-wheel 11, which has a central opening or bore 12, in which the upper end of the spindle 7 can pass and whereby said spindle is guided at its upper end. The spindle 5 is shown connected with the spur-wheel 11 by a threaded extension $5^a$, that engages threads $12^a$ in the bore 12, the spindle 5 being shown provided with an annular flange $5^b$, that bears on a tube-like extension $3^a$ on the cover 3, or the spindle 5 and wheel 11 may be otherwise suitably connected together.

As shown in Fig. 1, the spindle 7 is connected with a friction-disk 15, the spindle passing centrally through said disk and being suitably secured thereto, as by a spline and groove $15^a$, as in Fig. 2. The friction-disk 15 is shown located at the under side of the wheel 11 and is adapted to be turned by the friction developed between said wheel and said disk when firmly pressed together, which will occur when the lever $6^a$ is lowered to press the tool 10 against the work, which raises spindle 7, and disk 15 is pressed upward against the wheel 11, which is pressed downward.

While the wheel 11 and disk 15 may be brought into direct frictional contact, I have shown a friction plate or disk 18 interposed between wheel 11 and disk 15. The advantages of the plate or disk 18 are that it may be readily replaced when worn by friction, and said plate 18 may be composed of rawhide, rubber, fiber, or other material that will increase the friction of the parts. The disk 18 is shown secured to wheel 11 by screws 17.

By preference I make the meeting faces of the parts 11, 15, and 18 cone-like, the wheel 11 having a cone-like recess at its under part that receives a cone-shaped disk 18, against which the cone-like top of the disk 15 abuts, as shown. These cone-like surfaces produce greater frictional contact than if the meeting faces were straight.

In operation the tapping device is advanced to the work by the lever 6ª (or the work may be advanced to the tool) until the tool 10 engages the work 10ª, whereupon the spindle 7 rises within the bore 12 of wheel 11 until the friction-disk 15 engages the wheel 11 or the interposed disk 18. Continued pressure on the device now increases the frictional contact between the parts 11, 15, and 18 until it is sufficient to cause wheel 11 to drive disk 15 and thus carry around the spindle 7 to cause the tool 10 to cut. Should the tool 10, however, meet with undue resistance, the surfaces of 11 and 15 (or 18 and 15 when disk 18 is used) slip, whereby breakage of the tool 10 is prevented.

Undue pressure of the parts upon the tool 10, exerted, say, by or through lever 6ª, would interfere with the proper cutting of said tool 10, even were it practical to exert sufficient pressure by this means to drive heavier cutters. Therefore when greater frictional contact is desired than is conveniently obtained by increasing the angle of the coned surfaces, means similar to those shown in Fig. 4 are necessary to adjust the degree of frictional contact in proportion to the work to be performed. In this case, rather than have the disk 15 rigidly and permanently connected with the spindle 7, I have shown it detachably connected with said spindle in such a manner as to be firmly connected therewith, when the spindle is moving in the driving direction, by a suitable clutch mechanism, as shown in Fig. 4, wherein spindle 7 has a suitable projection, pin, or clutch formation 13, that is adapted to engage a clutch formation 14 on the friction-disk 15, said disk having a central bore 14ª, in which the spindle 7 is located and whereby the disk 15 surrounds said spindle, as well as does the clutch formation 14. The clutch formation 13 14 may be of suitable construction, the part 14 preferably having a tooth 14ᵇ to engage the part 13, or said clutch may be made substantially as shown in my said applications.

To provide means for regulating the tension of the frictional contact of disk 15 and the wheel 11 I utilize a ring or plate 16, that is placed against the under side of the disk 15, said ring acting, through the medium of screws 17, to press the disk 15 with more or less force against the wheel 11 or against the friction-plate 18, which may be interposed for the various purposes before mentioned.

The screws 17, Fig. 4, are shown carried by wheel 11 near its outer edges, and I may use two, three, or any desired number of said screws, but preferably three. The screws 17 register with suitable apertures 19 in the cover 3, whereby said screws may be reached in order to adjust them. I preferably use differential screws—that is to say, screws provided each with threads of different pitch. In the example shown in Fig. 4 the screws 17 have fine threads 20, that mesh with corresponding threads 21 in recesses 22 in the wheel 11, and the lower parts of the screws 17 have coarser threads 23, that engage correspondingly-threaded apertures 24 in the ring 16. By these means when the screws 17 are turned the threads 23 will advance ring 16 with greater speed than the screws advance in the recess 22, whereby the differential threads on the screws 17 coact with the ring 16 to lock the adjusting parts in place without using lock-nuts or other locking devices, and enable the same exertion of force to secure greater pressure than would be possible with a screw having threads of the same diameter and pitch throughout. Means are also provided for causing the spindle 5 to turn the spindle 7 in a reverse direction to that given through the action of the disk 15, and for this purpose I have shown the spur-wheel 11 as meshing with a transmitting-pinion 25, that is journaled in the casing 1 and which meshes with another reversing-pinion 26, also journaled in said casing and located beneath the wheel 11. The pinion 25 is wider (or deeper) than the face of the spur-wheel 11, and for convenience I term the pinion 25 "double-depth," because it engages both the wheel 11 and pinion 26 on the same side, as shown. The pinion 26 meshes with a spur-wheel 27, that is smaller than the wheel 11, having its axis concentric with that of wheel 11 and being located beneath the same, as shown. The size of the driving-wheel may vary; but to secure the advantages of the use of the "double-depth transmitting-pinion" 25 the inside working-depth diameter of the driving-wheel 11 must be greater than the addendum diameter of the reversing-wheel 27. The wheel 27 has a central bore 28, within which the spindle 7 freely slides and turns. The wheel 27 is shown carried by a ring 29, to which it is connected by suitable threads and within which the spindle freely slides and turns. The wheel 27 and ring 29 could of course be made in a single piece of metal, if desired.

The above mechanism is shown and described in my said application, Serial No. 505,256, and it will be understood that the means for reversing the motion of spindle 7 may be otherwise suitably arranged for coaction with my present improvements.

The ring 29 on the wheel 27 carries a suitable clutch formation 30, which may consist of one or more suitably-shaped teeth. In Fig. 1 the disk 15 is shown provided with a projection or clutch formation 14ᵇ to engage the tooth or clutch formation 30 when the latter is brought into engagement therewith by the lifting of the wheel 27 as the case 1 is raised, the tool 10 remaining in the work and holding the spindle 7 from rising, (or the work 10ª may be withdrawn from the device, pulling spindle 7, and thereby causing the clutch formations 14ᵇ and 30 to engage,) whereby the reverse rotation of the wheel 27 will cause the spindle 7 to rotate in the reverse direction to that imparted to it by frictional contact of disk 15 with wheel 11. During this action the disk 15 is withdrawn from contact with the disk 18 or wheel 11. In Fig. 4 the same action of reversing the rotation of spindle 7 takes place by the engagement of the projection or clutch 13 on said spindle with the clutch formation 30. In this case the disk 15 rises with the wheel 11, (or retains its relative position thereto,) as it is free from the spindle 7. In both cases the friction-disk 15 causes the spindle 7 to turn in the driving direction by means of the friction between said disk and the wheel 11 or disk 18.

Having now described my invention, what I claim is—

1. The combination of a driving-wheel 11, adapted for connection with a rotative driving part and having gear-teeth upon its periphery that are parallel with its axis, a friction-disk to be driven by frictional engagement with said wheel, a longitudinally-movable spindle, means to connect said disk with said spindle to drive the latter in one direction, a reversing-wheel 27, surrounding said spindle and having gear-teeth upon its periphery that are parallel with its axis, means to connect said last-mentioned wheel with said spindle to drive the latter in the reverse direction to that first mentioned, a reversing-pinion 26, carried by a non-rotary part or casing 1, and meshing with said reversing-wheel 27, and a double-depth transmitting-pinion 25, similarly carried and meshing with the driving-wheel 11, and the reversing-pinion 26, substantially as described.

2. The combination of a driving-wheel 11, adapted for connection with a rotative driving part and having gear-teeth upon its periphery that are parallel with its axis, a longitudinally-movable spindle, a friction-disk to be driven by frictional engagement with said wheel, means to regulate the frictional tension between said disk and said wheel, means for connecting said longitudinally-movable spindle with said disk to turn said spindle in one direction, a reversing-wheel 27, surrounding said spindle and having gear-teeth upon its periphery that are parallel with its axis, means to connect said last-mentioned wheel with said spindle to turn the latter in the opposite direction to that first mentioned, a reversing-pinion 26, carried by a non-rotary part or casing 1 and meshing with said reversing-wheel 27, and a double-depth transmitting-pinion, similarly carried and meshing with the driving-wheel 11, and with the reversing-pinion 26, substantially as described.

3. The combination with a non-rotary part carrying a reversing-pinion, of a wheel adapted for connection with a rotative driving part, a longitudinally-movable spindle, a clutch formation connected therewith, another wheel, gearing for connecting said wheels with said reversing-pinion, a friction-driven disk and means to connect said disk with said spindle, one of said wheels having a frictional surface on its inner face for engagement with said disk, the other of said wheels having a central bore in its inner face, a clutch formation located in said bore and connected with said wheel, the inner face of said clutch formation lying within the plane of the inner face of said wheel, to permit the entrance of said spindle clutch formation within the surface of said wheel, substantially as described.

4. The combination of a wheel for connection with a rotative driving part, a friction-driven disk for connection with said wheel, self-locking means for adjusting the frictional tension between said wheel and said disk in accordance with the work to be done, a longitudinally-movable spindle, and means for turning said spindle by said disk in one direction, and means connected with said wheel for turning said spindle in the reverse direction to that first mentioned, substantially as described.

5. The combination of a wheel provided with a plurality of eccentrically-located screw-threaded rods, a disk having frictional contact with said wheel, located between said rods, and provided with a positive clutch, a clamping part connected with each of said rods, a longitudinally-movable spindle, a clutch connected therewith for engagement with said positive clutch of said friction-disk, another wheel provided with a clutch, and a casing carrying gearing to transmit and reverse motion from one of said wheels to the other, substantially as described.

6. The combination of a wheel or body for connection with a rotative driving part, a friction-disk for connection therewith, a ring to hold said disk upon said wheel, differential screws for pressing said ring upon said disk, a spindle, and means for connecting said disk with said spindle, substantially as described.

7. The combination of a wheel or body for connection with a rotative driving part, said wheel having screw-threads 21, a friction-disk for connection with said wheel, a ring for clamping said disk upon said wheel, said ring having screw-threads 24, of different pitch from the threads 21, differential screws having threads to engage the corresponding threads 21, and 24, to hold and lock said ring upon said wheel, a spindle, and means for connecting said spindle with said disk, substantially as described.

F. ALFRED ERRINGTON.

Witnesses:
T. F. BOURNE,
ARTHUR THAYER.